United States Patent
Abplanalp (12) 
(10) Patent No.: US 6,651,850 B2
(45) Date of Patent: *Nov. 25, 2003

(54) FLEXIBLE BARRIER MEMBER USEFUL IN AEROSOL DISPENSERS

(76) Inventor: Robert Henry Abplanalp, Ten Hewitt Ave., Bronxville, NY (US) 10708

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,626

(22) Filed: Jun. 12, 1997

(65) Prior Publication Data

US 2001/0008244 A1 Jul. 19, 2001

Related U.S. Application Data

(63) Continuation of application No. 08/723,718, filed on Sep. 30, 1996, now abandoned, which is a continuation of application No. 08/371,988, filed on Jan. 12, 1995, which is a continuation-in-part of application No. 08/577,064, filed on Dec. 22, 1995, which is a continuation-in-part of application No. 08/572,116, filed on Dec. 14, 1995, which is a continuation-in-part of application No. 08/442,638, filed on May 17, 1995, which is a continuation-in-part of application No. 08/292,062, filed on Aug. 17, 1994, which is a continuation-in-part of application No. 08/277,258, filed on Jul. 19, 1994, now abandoned, which is a continuation-in-part of application No. 08/253,143, filed on Jun. 2, 1994, now abandoned, which is a continuation-in-part of application No. 08/084,638, filed on Jun. 29, 1993, now abandoned.

(51) Int. Cl.$^7$ .................................................. B67D 5/60
(52) U.S. Cl. ................................... 222/143; 222/386.5
(58) Field of Search .............................. 222/143, 386.5, 222/387, 389

(56) References Cited

U.S. PATENT DOCUMENTS

| | | |
|---|---|---|
| 3,022,923 A | 2/1962 | Hoffman, Jr. |
| 3,109,463 A | 11/1963 | Clemens |
| 3,756,476 A | 9/1973 | Bonduris |
| 3,788,521 A | 1/1974 | Laauwe |
| 3,896,970 A | 7/1975 | Laauwe |
| 3,929,132 A | 12/1975 | Higuchi |
| 4,067,499 A | 1/1978 | Cohen |

Primary Examiner—Joseph A. Kaufman
(74) Attorney, Agent, or Firm—Kilgannon & Steidl (57) ABSTRACT

In its broadest aspect, the present invention concerns a unitary flexible barrier of phallic configuration for use in a plural-zoned, valved pressure container wherein the barrier has a shaped spatial form having sufficient rigidity to maintain its shape prior to insertion into and use in a plural-zoned, valved pressure container. The barrier comprises a flexible wall portion, the free terminal end of the flexible wall portion forming a seal and the terminus of the flexible wall portion distal to the seal extending into a central piston region that closes the barrier. The wall portion is steeply frusto-conical in shape.

19 Claims, 5 Drawing Sheets

FLEXIBLE BARRIER MEMBER USEFUL IN AEROSOL DISPENSERS

This application is a continuation of application Ser. No. 08/723,718 filed on Sep. 30, 1996, now abandoned, which is a continuation of Ser. No. 08/371,988 filed on Jan. 12, 1995, which is a continuation-in-part of Ser. No. 08/277,258 filed on Jul. 19, 1994, now abandoned which is a continuation-in-part of Ser. No. 08/572,116 filed on Dec. 14, 1995, which is a continuation-in-part of Ser. No. 08/253,143 filed on Jun. 2, 1994, now abandoned, which is a continuation-in-part of Ser. No. 08/442,638 filed May 17, 1995, now abandoned, which is a continuation-in-part of Ser. No. 08/577,064 filed Dec. 22, 1995, which is a continuation-in-part of Ser. No. 08/084,683 filed Jun. 29, 1996, now abandoned, which is a continuation-in-part of Ser. No. 08/292,062 filed Aug. 17, 1994.

BACKGROUND OF THE INVENTION

1. Field of the Invention

This invention relates to pressurized dispenser packages, such as aerosol packages, wherein the product to be dispensed and the pressure-generating media, i.e. the propellant, are maintained in isolation through separation on opposite sides of a barrier. An aerosol package of this type is generally referred to as a "barrier pack" aerosol package.

2. Description of the Prior Art

Aerosol barrier packs of the prior art have been of at least three general types. In the piston-type barrier pack the barrier is a piston-like component that is mounted in the container in sliding relation to the inside surface of the container. The product to be dispensed is disposed on the valved side of the piston and the propellant, which generates pressure within the container, is on the opposite of the piston. In Aerosol Handbook, Second Edition, 1982, there is described a piston-type aerosol dispenser marketed by American Can Company under the trade-name "Mira-Flo". In the Mira-Flo dispenser the piston skirt is designed to seal against the sides of the container to prevent the propellant gas from passing into the product chamber on the other side of the piston. Actuation of the aerosol discharge valve causes a reduction in pressure in the product chamber thereby resulting in the pressure in the propellant chamber urging the piston toward the discharge valve. Examples of a piston-type barrier pack are described in U.S. Pat. Nos. 3,022,923, 3,756,476 and 3,929,132.

In a second type of aerosol barrier pack, a flexible, collapsible bag is affixed within the container opening either to the aerosol discharge valve or to the bead of the container opening. The Continental Can Company in the late 1960's introduced an aerosol barrier dispenser known as the "Sepro-Can". The Sepro-Can includes an interior plastic product bag having an opening that is attached to the valve opening at the top of the container. The side walls of the bag extend along the side walls of the container and are pleated like an accordion so the bag can collapse inward and upward under the influence of pressure in the remainder of the container as the bag is emptied. Patents which illustrate a barrier pack of the second type are set forth in U.S. Pat. Nos. 3,788,521, 3,896,970 and 4,067,499. Modifications of barrier packs of the second type include attaching the bag to the side wall of the container or to the joint formed between the side wall of the container and the top of the container.

A third type of prior art barrier pack is an unfolding cup-shaped barrier wherein the barrier has an outer wall terminating in a sealing flange, said outer wall being disposed contiguous to the inner wall of the container. The inner wall of the barrier is initially folded within the outer wall, the inner wall terminating in an end closing portion. The barrier is contained in a valved aerosol container and sealed at the joint formed between the sidewall and the bottom end closure of the container. Product is admitted through the valved opening of the container and propellant through a port in the bottom end closure of the container. Actuation of the valve reduces the pressure in the product compartment and results in the inner wall of the barrier unfolding from within the outer wall of the barrier to advance and thereby urge the product toward the discharge valve. A patent which illustrates the third type of prior art barrier pack is U.S. Pat. No. 3,109,463.

A problem with the piston-type barrier pack of the first type is the imperfect seal between the side skirt of the piston and the side wall of the container which allows propellant to seep into the product with consequent discharge of propellant during product discharge as well as contamination of the product with propellant. Also, it is not uncommon for aerosol containers to be dented and thus lose their true circumferential shape, with the consequence that the piston is incapable of axial movement within the container past the aberrant configuration.

A problem with barrier packs of the second type wherein the barrier is affixed to the valve or valve opening of the container is that the barrier collapses in a manner to cause pocketing of the product within the collapsible barrier with consequent undesirable diminution of the evacuation of the product from the container.

In the third type of prior art barrier pack described herein, the unfolding cup-shape barrier does not advance progressively and uniformly against the inner wall of the container but tends to pocket and entrap product against the wall or within pockets formed in the barrier itself as it unfolds. Attempts to solve these problems have included adding an additional rigid piston to the end-closing portion of the inner wall, or adhering the outer wall of the barrier in peelable fashion to the inner wall of the container. Generally, barriers of the third type can be difficult to form, as well as to insert into and seal with the container.

There is, therefore, a need for a flexible product/propellant barrier for an aerosol container that is easy to manufacture and ship, that is easy to insert into and seal to the container, that prevents leakage of the fluids from one compartment to the other compartment, and that does not pocket and therefore preclude evacuation of significant amounts of the product to be discharged.

SUMMARY OF THE INVENTION

The present invention relates to an improvement in the third type of barrier pack. In its broadest aspect, the present invention concerns a unitary flexible and expandable barrier of phallic configuration for use in a plural-zoned, valved pressure container wherein the barrier has a shaped spatial form having sufficient rigidity to maintain its shape prior to insertion into and use in a plural-zoned, valved pressure container. The barrier comprises a flexible and expandable wall portion, the free terminal end of the flexible and expandable wall portion forming a sealing means and the terminus of the flexible and expandable wall portion distal to the sealing means extending into a central piston region that closes the barrier. The wall portion is steeply frusto-conical in shape. The wall portion of the barrier of this invention has a first portion which terminates in the central piston region and a second portion which terminates at its free end in the sealing flange. Further, when the barrier is top sealed within a container and when the second portion is substantially thicker than the first portion, the wall portion of the barrier is, during product discharge from the container, sufficiently flexible and expandable to permit the wall portion and its central piston region to move in an axially upward direction under the influence of propellant pressure to more or less fold within itself.

When the aforedescribed barrier is bottom sealed in the container, the wall portion of the barrier is, during product discharge from the container sufficiently flexible and expandable to permit the wall portion and its central piston region to move in an axially upward direction under the influence of propellant pressure to more or less assume a phallic configuration.

Still further, the wall portion of the barrier has sufficient flexibility and expandability to extend outwardly, under the influence of propellant pressure, in the case where the barrier is bottom sealed, and under the influence of product pressure in the case where the barrier is top sealed, to substantially conform to the inner surface of the container.

As noted above, the wall portion of the barrier of this invention may be viewed as having a first upper wall portion terminating in the central piston region and a second wall portion terminating in the free-end sealing means.

In the case where the barrier of phallic configuration is bottom sealed to the container, when the second wall portion is sufficiently thicker and more rigid than the first wall portion, the first wall portion will invert within the second wall portion under the influence of product pressure during filling of the container with product. During evacuation of the product in a bottom sealed barrier having a thicker and more rigid second wall portion, the second wall portion will conform to the shape of the inside surface of the container and the first wall portion will move axially toward the container opening and ultimately assume a more or less phallic configuration, i.e. the configuration of the barrier prior to product filling of the container. The first wall portion will also conform to the shape of the inside surface of the container.

Again, in the case of bottom sealing, but where the first and second wall portions are of comparable thickness and rigidity, during product filling of the container, the barrier throughout its length will crush and not assume the inversion configuration of the first wall portion into the second wall portion. During evacuation of product from a bottom-sealed barrier having comparable first and second wall portions, the barrier will ultimately assume the initial phallic configuration and will then conform to the inside surface of the container.

In the case where the barrier is top sealed to the container, when the second wall portion is thicker and more rigid than the first wall portion, the first wall portion will invert within the second wall portion under the influence of propellant pressure during discharge of product. Again, with a top sealed barrier and in the instance where the first and second wall portions of the barrier are of comparable thickness and rigidity, evacuation of product will cause the barrier to assume a non-descript, crumpled configuration as the barrier moves toward the valve of the container under the influence of propellant pressure. However, the non-descript, crumpled configuration still permits excellent evacuation of product from the barrier.

By virtue of having sufficient rigidity to maintain its shape prior to insertion into the container, as well as the presence of the tapered wall portion, the barrier of the present invention is very easily insertable into the container. By virtue of the tapered contour of the wall portion of the barrier, the barrier is nestable with like barriers for convenience and cost savings in shipping. Further, the nesting facilitates fast and simple machine feeding of stacked barriers sequentially into the containers.

In a preferred form of the invention the sealing flange is thicker than the first and second wall portions; the first wall portion also is of slightly less length than the second wall portion; and the sealing means is a radially extending flange which acts as a gasket between the container and the respective top or bottom closures of the container. The central piston region also may be thicker than the first wall portion.

A particularly advantageous material for barriers is polyethylene terephthalate (PET). Where permeation across the barrier is a concern, the barrier of the present invention may utilize a unitary multi-layer configuration. Such multi-layer configurations, their materials of construction and their manufacture, are well known to those skilled in the art. Generally, in a three-layer system, the inner layer is a material that prevents transport of propellant and product therethrough and the outer layers are inert to the propellant and product.

DETAILED DESCRIPTION OF THE INVENTION

Figure 1:
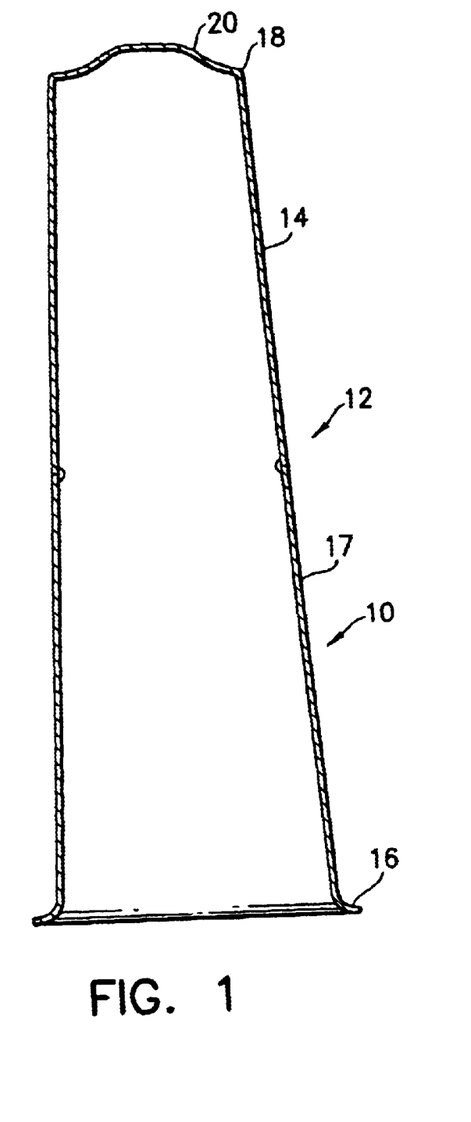
FIG. 1 is an elevational cross-sectional view of an embodiment of the barrier of this invention.

Referring now to the drawings, FIG. 1 shows a unitary barrier generally designated at 10, as it is initially formed, said barrier comprising a flexible and expandable wall 12, the wall 12 terminating at its free-end in a sealing flange 16. The wall 12 has a first wall portion 14 and a second wall portion 17. At the terminus 18 of the first wall portion 14, central piston region 20 extends inwardly to close the barrier. It should be noted that the wall 12 has a steeply frusto-conical shape extending from the sealing flange 16 to the terminus 18.

The wall 12, including the sealing flange 16, is sufficiently thick and rigid to impart a shaped spatial form to the barrier and causes the barrier to be free-standing and ready for insertion into the container.

Figure 2:
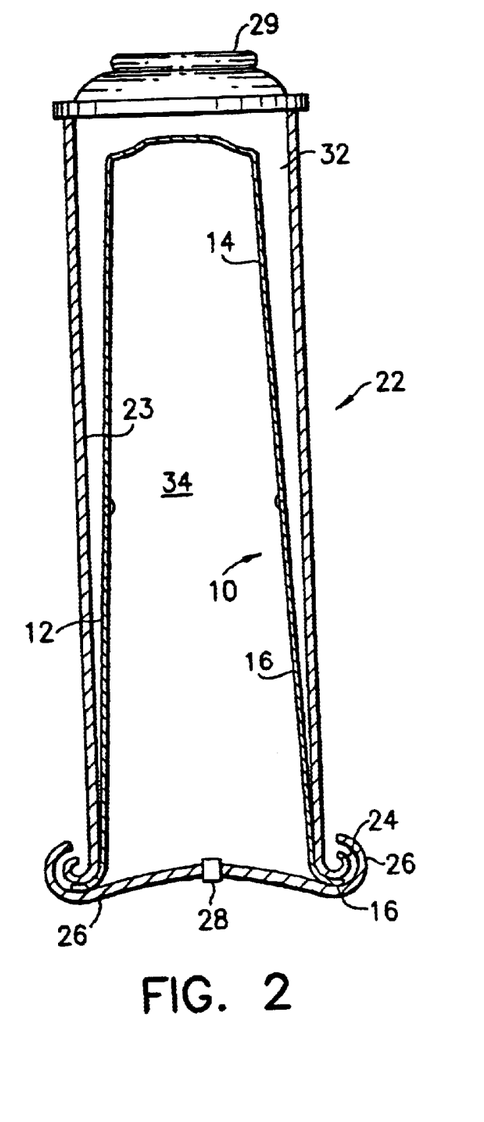
FIG. 2 is an elevational cross-sectional view of the barrier of FIG. 1 bottom sealed within an empty aerosol container with the top opening of the container shown in schematic and the aerosol valve not shown.

FIG. 2 shows the barrier 10 inserted in a valved pressure container generally designated as 22, having inner wall surface 23, and permanently joined to the container through the sealing flange 16 by an appropriate crimping of the flange 16 between the joint formed by the lower end 24 of the sidewall of the container 22 and the perimeter of the bottom closure 26 of the container 22. Without intention to limit the type of pressure container (aerosol) with which the barrier pack of this invention may be usefully employed, it has been found particularly useful when employed with an aerosol container commonly referred to as a "necked-in" container. A sealable port 28 is provided in the bottom closure 26 for introduction of propellant. A manually actuable valve (not shown) is positioned in a manner well-known to those skilled in the art in the opening 29 of the pressure container 22.

In FIG. 2, the barrier 10 divides the interior of the container 22 into a plural zoned pressure container; the upper zone 32 for receiving the product to be dispensed and the lower zone 34 for receiving the propellant. Generally, the container manufacturer will insert the barrier 10 into container 22, and seal the barrier to the container as described above. A product filler will thereafter fill the product and propellant into the respective chambers 32 and 34.

For many applications of the barrier pack of the present invention within an aerosol container, the barrier 10, as shown in FIG. 1, will be inserted and bottom sealed into the container 22 as shown in FIG. 2 and as described above.

Figure 3:
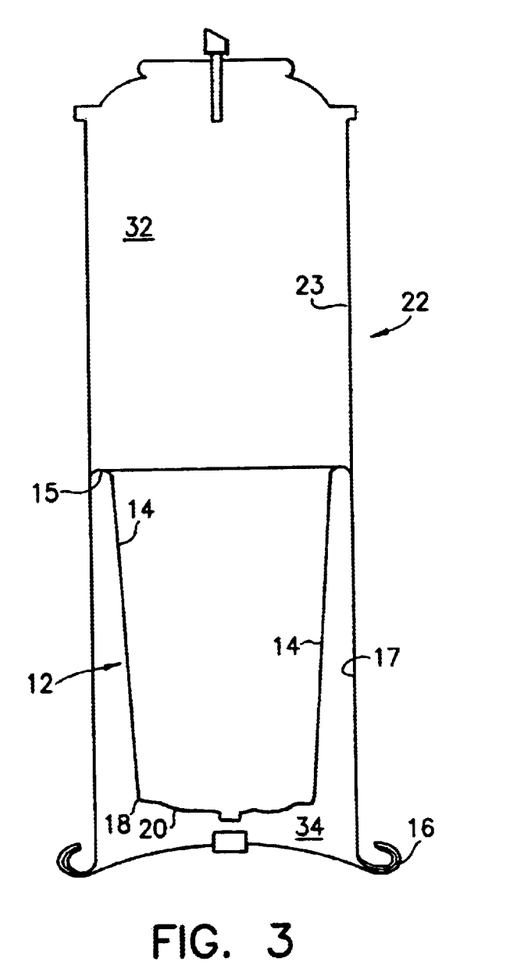
FIG. 3 is a schematic view of the barrier of this invention within an aerosol container showing the barrier with a bottom seal and the barrier in a position after loading of the product into the container.

After the barrier 10 has been sealed into the container as shown in FIG. 2, product may be pressure filled into the zone 32 to cause the barrier 10 to refold to the shape, or similar to the shape, as shown in FIG. 3, in the instance where the second wall portion 17 is thicker and more rigid than the first wall portion 14. Where the first and second wall portions of the wall 12 of the barrier 10 are of the same thickness and rigidity, the barrier 10 will assume a crumpled, non-descript shape. When product is then evacuated, the barrier 10 first assumes the phallic shape of FIG. 2 and then the shape of FIG. 4.

Figure 4:
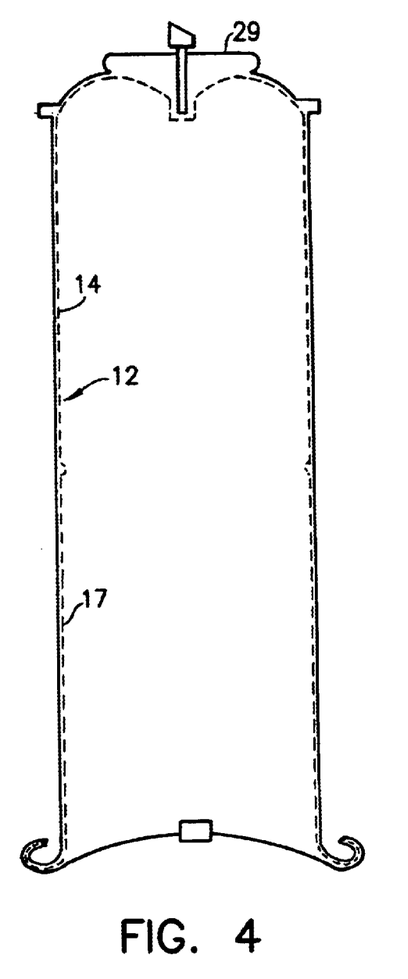
FIG. 4 is a schematic view of the barrier of this invention within an aerosol container as in FIG. 3, after the product has been fully evacuated from the container.

FIG. 4 shows the barrier 10 in the position after full evacuation of the container. Due to the frusto-conical shape of the wall segment 12, the contact and conformance of the wall portion 12 occurs progressively upwardly from flange 16, thereby clearing the space between the wall portion 12 and the inner wall surface 23 of the container 22 of product.

Upon continuous or intermittent actuation of the valve disposed in the top opening of the pressurized container, product will be evacuated from the container by lowering the pressure in the product zone 32 and causing the greater pressure in the propellant zone 34 to expand the barrier against the product and force the product through the discharge valve of the container. As product is evacuated from the container 22, the first wall portion, 14 moves axially toward the aerosol discharge valve as the barrier unfolds.

The barrier may be dimensioned such that after evacuation of most of the product in the container the central piston region has not yet risen high enough to shut off the product discharge orifice(s) in the valve. As evacuation nears its completion, the barrier may expand to assume the configuration shown by the dotted line in FIG. 4, it being understood that in FIG. 4 the wall portions 14 and 17 contact and fully conform to the inner wall surface 23 of the container 22.

It has been observed and as shown in FIG. 4, that the frusto-conical configuration of the inner wall segment 14, as well as the expandable nature of the barrier 10 toward the inner wall surface 23 of the container 22, results in the wall portion 12 of the barrier 10 progressively advancing in an axial direction against the inner wall surface 23 of the pressure container to cause the progressive advance of the product to the discharge valve and a minimization of the capture or entrapment of product between the outer surface of the barrier and the inner surface of the container. Pockets are not observed to form within the barrier itself.

Figure 7:
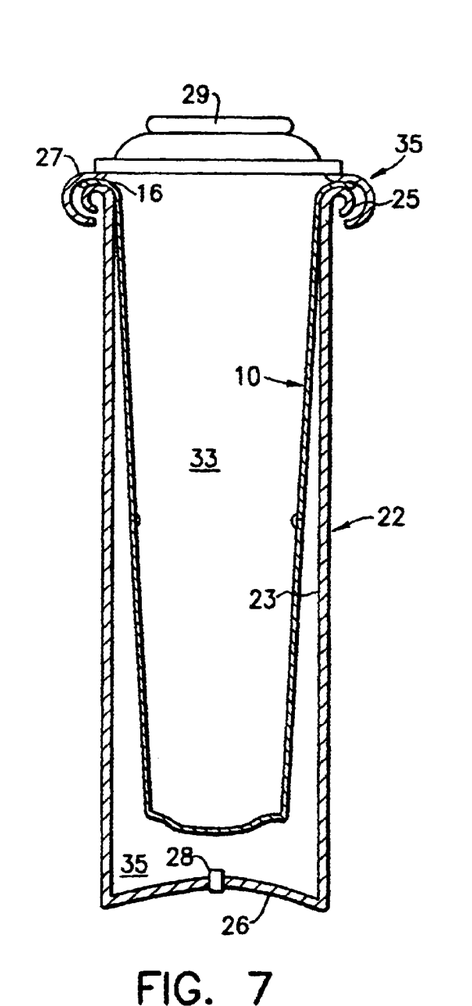
FIG. 7 is an elevational cross-sectional view of the barrier of FIG. 1, inverted 180°, top sealed within an empty aerosol container with the top opening of the container shown in schematic and the aerosol valve not shown.
Figure 8:
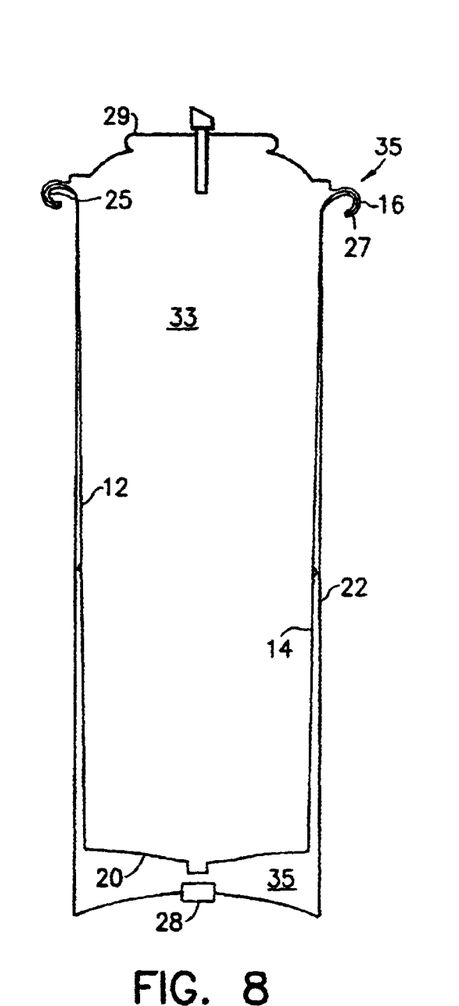
FIG. 8 is a schematic view of the barrier of this invention within an aerosol container as shown in FIG. 7, after the loading of the product.

A further alternative is to top seal the barrier of this invention, i.e., to invert the barrier of this invention and seal the sealing flange 16 between the top portion of the container 22 and the upper sidewall of the container 22. As shown in FIG. 7 in such a top sealing arrangement, product may be introduced into the product zone 33 to cause the barrier 10 to fully expand downwardly within the container 22 to substantially conform to the inner surface 23 of the container 22. During the filling of the product into the container it may be necessary to provide a means for evacuating air in the propellant zone 35. After introducing propellant into the propellant zone 35, the container 22 is ready to function to discharge product through actuation of the aerosol valve positioned in the container opening 29. Upon complete evacuation of product from the container 22, and where the second wall portion 17 of the barrier 10 is thicker than and more rigid than the first wall portion 14, the barrier 10 will assume a shape such as in FIG. 9, wherein the first wall portion 14 will be folded within the second wall portion 17 but, with the sealing flange 16 being top sealed, the barrier 10 will be in an inverse relation within the container to that shown in FIG. 2. Where the second wall portion 17 of the barrier is of the same thickness as the first wall portion 14, the barrier will assume a non-descript, crumpled configuration.

Figure 5:
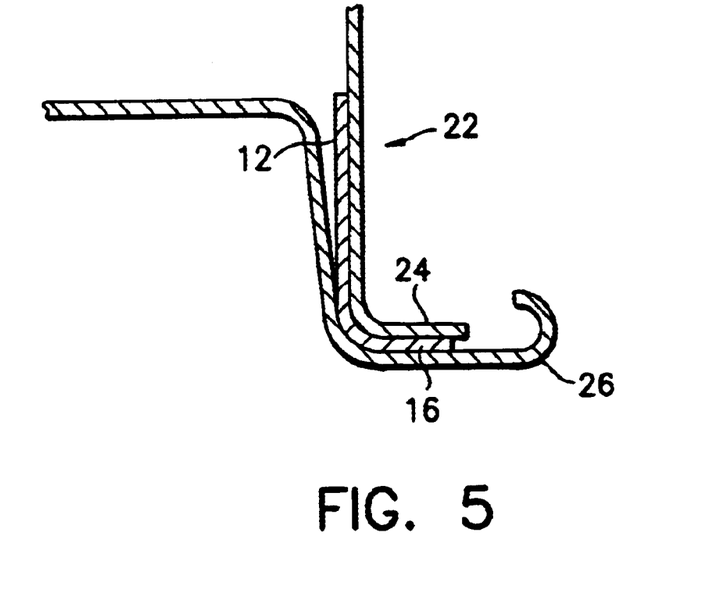
FIG. 5 is a partial schematic cross-sectional view of an embodiment for forming the seal between the barrier sealing means, the sidewall of the container and the bottom closure of the container.

FIG. 5 shows a configuration for annexing the barrier 10 to the container 22. FIG. 5 shows the barrier sealing means to be a terminal flange 16 extending from the second wall portion 17. The flange 16 fits tightly between the flanges 24 and 26. The seam is formed by rolling the flanges 24, 26 and 16 toward the wall 12 to form a rolled seam by techniques known to those skilled in the art. A double roll seam may be used. The thickness and length of the sealing flange 16 is dictated by the requirements of rolled seams, which may vary by type of container and rolling equipment. The sealing flange 16 may be thicker than the contiguous second wall portion 17. The sealing flange 16 may function as a gasket in sealing the barrier to the base of the container. If necessary, an adhesive may be provided to the components that are to be roll seamed. It has been found that a flange thickness of 0.010 inch provides an adequate seal.

Figures 9, 10, 11:
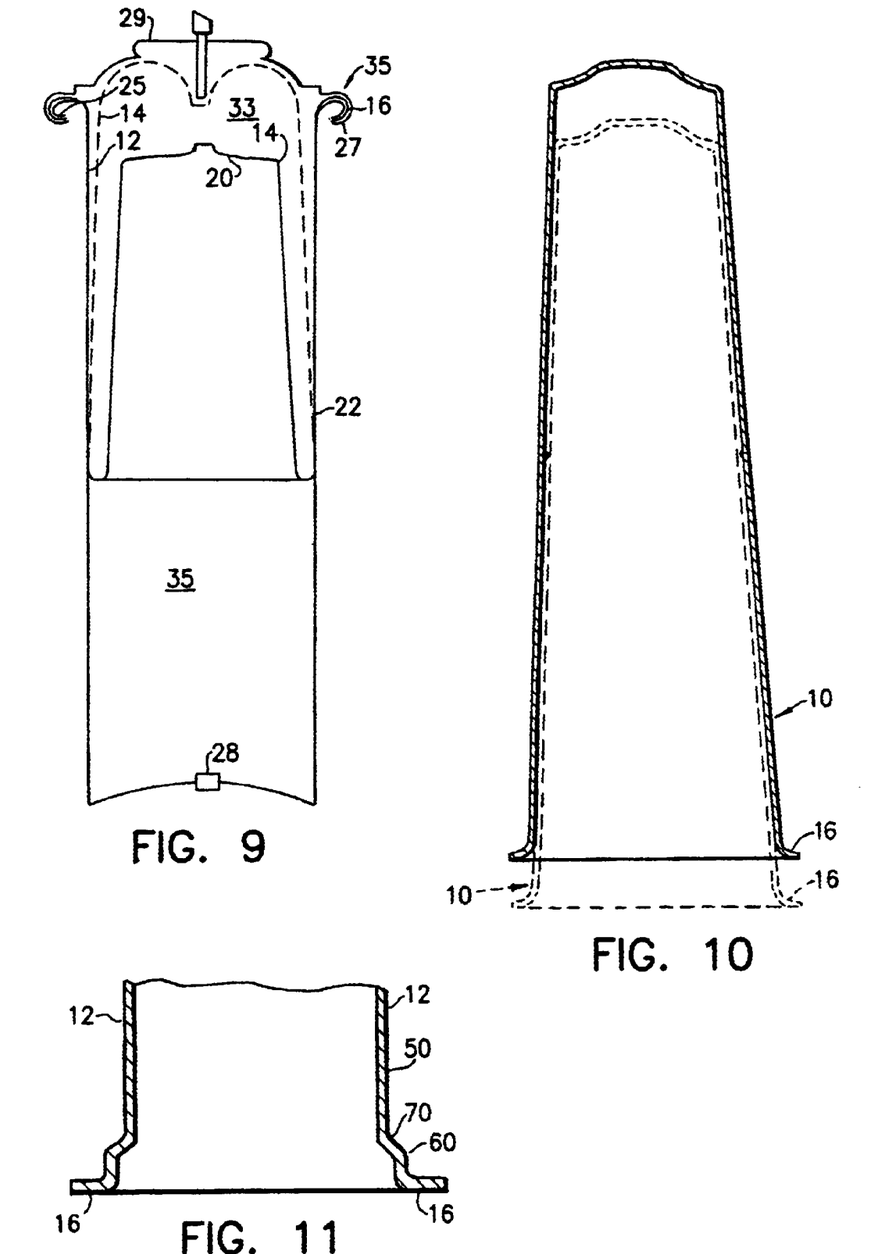
FIG. 9 is a schematic view of the barrier of this invention within an aerosol container, as in FIG. 8, after the product has been fully evacuated from the container.
FIG. 10 shows barriers of this invention in a nesting relation.
FIG. 11 is a partial cross-sectional view of the sealing flange and second wall portion of the barrier of this invention.

FIG. 11 shows a partial cross-sectional view of the terminal sealing end of a preferred barrier of FIG. 1. Wall portion 12 has a thickness of 0.004 inches extending downwardly from piston 20 to a wall position indicated as 50. Beginning at 50 and extending downwardly 0.250 inches to the position indicated as 60, there is a wall thickness transition zone increasing from 0.004 inches at 50 to 0.010 inches at 60. The wall thickness extending downwardly from 60 remains at 0.010 inches, and this thickened region of wall 12 provides for a proper sealing of the flange 16 at the top or bottom of the container. Wall portion 12 extends vertically downward 0.271 inches from position 60 to flange 16. Nesting edge 70 extends at a forty-five degree angle, which ledge functions to permit flange 16 of the next above barrier to rest thereon when the barriers are nested as shown in FIG. 10.

A barrier of this invention found suitable for use with a 202/205×604 necked-in container has the following dimensions:

(a) Sealing flange thickness—0.010"
(b) Axial length of barrier—6.375"
(c) Outside diameter at top of first wall portion—1.969"
(d) Dimensions for transition zone to bottom of barrier are set forth herein in above discussion of FIG. 11.
(e) Taper of barrier wall—1° toward first wall portion.

The tapering of the wall portion 12 of the barrier 10 facilitates the invagination of the barrier of the present invention into the pressurized container. The presence of the tapering also allows maximum nesting of the barriers for convenience and cost savings in shipping the barriers from a manufacturing site to the site of the container manufacturing operation. At the container manufacturing site, the stacks of nested barriers facilitate fast and easy feeding of the barriers sequentially into the containers. Each nested barrier may be pulled from its stack into its intended container under the influence of an initial vacuum in the container shell, each barrier as it is inserted into its container shutting off the vacuum; alternatively each nested barrier may be blown by air from its stack into the intended container. The next container shell is fed under the stack of nested barriers, and the identical action continues for the next container and next barrier. Containers continue to be sequentially fed under the nested stacks of barriers, and the nesting provides for a high speed and very simple feeding operation.

Figure 6:
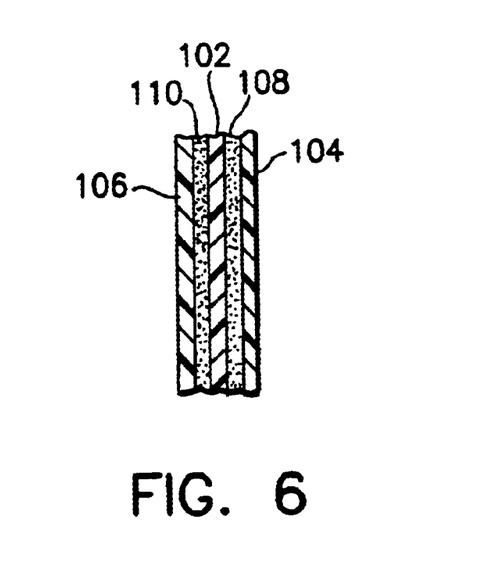
FIG. 6 is a partial cross-sectional view of a multi-layered barrier of the present invention.

In order to overcome the problem of permeation of propellant and/or product through the barrier found in prior art dispensers, the flexible barrier in accordance with the present invention is optionally made of a multilayered material. FIG. 6 shows a wall construction consisting of an inner layer 102 designed to prevent transport of propellant and product. Layer 102 is sandwiched between outer layers 104 and 106 that are inert to propellant or product in contact with the outer layers. Adhesive layers 108 and 110 are optionally provided, or alternatively the inner and outer layers 102, 104 and 106 may be fused together by heat or other means. In one embodiment, the inner layer 102 is a gas barrier layer and the outer layers 104 and 106 are aqueous or organic fluid barrier layers. The gas barrier layer may be made of PET, ethylene vinyl alcohol, polyvinylalcohol, polyvinylidene chloride, polyacrylonitrile, cellophane or other similarly suitable materials. The outer layers may be made of PET, polyethylene, (especially high density polyethylene) polypropylene, polytetrafluoroethylene, polybutane, surlyn ionomer, butyl rubber, polyvinylidene chloride, polychlorotrifluoroethylene, Penton, polyvinylfluouride or other similarly suitable materials. Ethylene vinyl alcohol and polyvinyl alcohol are preferred gas barrier materials and high density polyethylene is a preferred aqueous or organic fluid barrier material.

Any propellants known in the art may be used with the dispenser and flexible barrier of the present invention. The barrier of the present invention requires smaller amounts of liquified propellants than required in non-barrier pack aerosol systems and in certain barrier pack systems using compressed gases, thus allowing the economic use of more expensive propellants. The present system lends itself to a maximization of the amount of product to be dispensed from a given container.

The barrier pack of this invention may be manufactured by utilizing a forming process generally referred to as thermoforming or by stretch blow molding.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

I claim:

1. A unitary flexible barrier for use in a plural-zoned, valved pressure container comprising:

a shaped spatial form having an open end providing a terminal sealing means, a flexible wall portion joined to the terminal sealing means at one end of the wall portion, and to a central piston region at the other end of the wall portion, said sealing means, wall portion and piston region being formed as a rigid unitary spatial form with sufficient rigidity to maintain its shape prior to insertion into and use in a plural-zoned pressure container;

said terminal sealing means being adapted for sealing in a container to form a propellant zone and a product zone; and, said wall portion having a steeply frustoconical shape and extending upwardly from the terminal sealing means to the piston region, said wall portion being dimensioned for insertion into the bottom or top of a container to form an initial spaced relationship with the inner side container surface and a nesting ledge extending outwardly from the wall portion at a position adjacent the terminal sealing means.

2. The barrier of claim 1, wherein the barrier is formed by stretch blow molding.

3. The barrier of claim 1, wherein the barrier is formed by thermoforming.

4. The barrier of claim 1, wherein said unitary barrier is comprised of PET.

5. The barrier of claim 1, wherein said unitary barrier is substantially fully nestable with further identical barrier members.

6. The barrier of claim 5, wherein the barrier wall portion has a nesting ledge at a portion adjacent the terminal sealing means.

7. The barrier of claim 1, wherein the thickness of the barrier wall portion is substantially constant throughout most of the wall extension between the piston region and the terminal sealing means.

8. The barrier of claim 7, wherein the barrier wall portion has a region directly adjacent the terminal sealing means thicker than the remainder of the barrier wall portion.

9. The barrier of claim 1, wherein the barrier wall portion has sufficient flexibility to permit said barrier wall portion and said central piston region to move in an overall axial direction within a container under the influence of propellant pressure.

10. The barrier of claim 1, wherein said terminal sealing means in a flange extending outwardly from the barrier wall portion.

11. The barrier of claim 1, wherein the barrier is multilayered, the inner layer being impervious to the transport of product and propellant and the outer layers being inert to the product or propellant contiguous thereto.

12. The barrier of claim 1, wherein the thickness of the barrier wall portion is non-uniform.

13. The barrier of claim 1, wherein said central piston region has an outer periphery that emerges from the wall portion at a substantial angle to said wall portion.

14. An aerosol container having a unitary flexible barrier disposed therein comprising:

a shaped spatial form having an open end providing a terminal sealing means, a flexible wall portion joined to the terminal sealing means at one end of the wall portion, and to a central piston region at the other end of the wall portion, said sealing means, wall portion and piston region being formed as a rigid unitary spatial form with sufficient rigidity to maintain its shape prior to insertion into and use in a plural-zoned pressure container;

said terminal sealing means being adapted for sealing in a container; and said wall portion having a steeply frustoconical shape and extending upwardly from the terminal sealing means to the piston region, and a nesting ledge extending outwardly from the wall portion at a position adjacent the terminal sealing means and, further, the container having a top, bottom and side wall, the barrier terminal sealing means being sealed between the top and side wall of the container, an opening in said top for mounting an externally actuable valve means, a closable opening in said bottom for introducing propellant into said container, and an externally actuable valve means extending through said top opening for dispensing product from within said container.

15. The aerosol container of claim 14, wherein the container is absent propellant and product.

16. The aerosol container of claim 15, wherein product is present in the container between the barrier and the externally actuable valve means, and propellant is present in the container between the barrier and the container bottom.

17. An aerosol container having a unitary flexible barrier disposed therein comprising:

a shaped spatial form having an open end providing a terminal sealing means, a flexible wall portion joined to the terminal sealing means at tone end of the wall portion, and to a central piston region at the other end of the wall portion, said sealing means, wall portion and piston region being formed as a rigid unitary spatial form with sufficient rigidity to maintain its shape prior to insertion into and use in a plural-zoned pressure container;

said terminal sealing means being adapted for sealing in a container; and said wall portion having a steeply frustoconical shape and extending upwardly from the terminal sealing means to the piston region, and a nesting ledge extending outwardly from the wall portion at a position adjacent the terminal sealing means and, further, the container having a top, bottom and side wall, the barrier terminal sealing means being sealed between the bottom and side wall of the container, an opening in said top for mounting an externally actuable valve means, a closable opening in said bottom for introducing propellant into said container, and an externally actuable valve means extending through said top opening for dispensing product from within said container.

18. The aerosol container of claim 17, wherein the container is absent propellant and product.

19. The aerosol container of claim 17, wherein product is present in the container between the barrier and the externally actuable valve means, and propellant is present in the container between the barrier and the container bottom.

* * * * *